| United States Patent [19] | [11] Patent Number: 4,940,775 |
| --- | --- |
| Drent | [45] Date of Patent: Jul. 10, 1990 |

[54] POLYKETONE FROM CARBON MONOXIDE/MONOETHYLENICALLY UNSATURATED HYDROCARBON/NON-CONJUGATED ALKADIENE

[75] Inventor: Eit Drent, Amsterdam, Netherlands

[73] Assignee: Shell Oil Company, Houston, Tex.

[21] Appl. No.: 352,234

[22] Filed: May 15, 1989

[30] Foreign Application Priority Data

Jul. 13, 1988 [NL] Netherlands .................... 8801773

[51] Int. Cl.$^5$ .............................................. C08G 67/02
[52] U.S. Cl. .................................... 528/392; 528/396
[58] Field of Search .................................. 528/392, 396

[56] References Cited

U.S. PATENT DOCUMENTS

| 3,694,412 | 9/1972 | Nozaki | 260/63 CQ |
| 3,929,727 | 12/1975 | Russell et al. | 260/45.95 |
| 4,024,104 | 5/1977 | Russell et al. | 260/45.8 |
| 4,788,279 | 11/1988 | Drent | 528/392 |

FOREIGN PATENT DOCUMENTS

| 121965 | 10/1984 | European Pat. Off. |
| 181014 | 5/1986 | European Pat. Off. |
| 213671 | 3/1987 | European Pat. Off. |
| 257663 | 3/1988 | European Pat. Off. |

*Primary Examiner*—Harold D. Anderson
*Attorney, Agent, or Firm*—Dean F. Vance

[57] ABSTRACT

Novel, linear alternating terpolymers of carbon monoxide, ethylenically unsaturated hydrocarbon and non-conjugated alkadiene having at least one carbon atom between the carbon-carbon double bonds are produced in the presence of a catalyst composition formed from a palladium compound, the anion of certain strong acids and a bidentate ligand containing phosphorus or nitrogen.

20 Claims, No Drawings

POLYKETONE FROM CARBON MONOXIDE/MONOETHYLENICALLY UNSATURATED HYDROCARBON/NON-CONJUGATED ALKADIENE

FIELD OF THE INVENTION

This invention relates to novel linear alternating terpolymers of carbon monoxide and dissimilar unsaturated hydrocarbons. More particularly, the invention relates to linear alternating terpolymers of carbon monoxide, ethylenically unsaturated hydrocarbon and non-conjugated ethylenically unsaturated diolefin.

BACKGROUND OF THE INVENTION

The class of polymers of carbon monoxide and olefin(s) has been known in the art for some time. Brubaker, U.S. Pat. No. 2,495,286, produced such polymers of relatively low carbon monoxide content in the presence of free radical initiators, e.g., peroxy compounds. U.K. Pat. No. 1,081,304 produced similar polymers of higher carbon monoxide content in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. More recent processes for the production of the linear alternating polymers, now becoming known as polyketones or polyketone polymers, are illustrated by a number of recently published European Patent Applications No. including 121,965, 181,014, 213,671, and 257,633, and by U.S. Pat. No. 4,788,279. The process, now considered broadly conventional, generally involves the use of a catalyst formed from a Group VIII metal selected from palladium, cobalt or nickel, the anion of a non-hydrohalogenic acid having a pKa of less than about 6, preferably less than 2, and a bidentate ligand of phosphorous, arsenic, antimony or nitrogen. The scope of the polymerization process is extensive but, without wishing to be limited, a preferred catalyst composition is formed from a palladium compound, particularly a palladium carboxylate such as palladium acetate, the anion of trifluoroacetic acid or p-toluenesulfonic acid and a bidentate phosphorous ligand such as 1,3-bis(diphenylphosphino)propane or 1,3-bis[di(2-methoxyphenyl)phosphino]propane.

The polyketone polymers have been shown to have a structure of the general type —CO—(—A—)— wherein A is the moiety of ethylenically unsaturated hydrocarbon. By way of specific illustration, a copolymer of carbon monoxide and ethylene will consist of the repeating unit —CO—(—C$_2$H$_4$—)— and a terpolymer of carbon monoxide, ethylene and propylene will have a random mixture of —CO—(—C$_2$H$_4$—)— units and —CO—(—C$_3$H$_6$—)— units along the polymer chain.

Although the properties of the polyketone polymers are desirable for many applications, it is useful on occasion to modify the properties of the polyketone as by functionalization of the polymer. For example, the carbonyl groups of the polyketone polymer are hydrogenated to produce corresponding polyols. Alternatively, an amount of diolefin is introduced into the polymeric chain and the remaining unsaturation, i.e., the unsaturation not employed as the site through which the polymerization takes place, is available for further chemical reaction to introduce other functional groups. In copending U.S. Pat. application Ser. No. 266,189, filed Nov. 2, 1988 there is disclosed a process for employing conjugated dienes as a monomer in the production of linear alternating polymers to produce a linear alternating polymer having pendant vinyl groups. A second copending U.S. Pat. application, Ser. No. 339,783, filed Apr. 18, 1989, discloses products produced when one monomer is an α, β-diene. Such processes do provide structural features to the linear alternating polymers through which additional functionalization can take place. However, the proportion of such dienes incorporated into the polymer chain is rather small so that the degree of functionalization available is rather low. It would be of advantage to provide novel polymers having a higher degree of pendant unsaturation and a process useful in the production of such polymers.

SUMMARY OF THE INVENTION

The present invention provides a novel class of linear alternating terpolymers having an improved proportion of pendant ethylenically unsaturated groups, and a process for the production of such polymers. More particularly, the invention provides novel terpolymers of (a) carbon monoxide, (b) ethylenically unsaturated hydrocarbon, and (c) a nonconjugated alkadiene having at least one carbon atom between the ethylenically unsaturated linkages.

DESCRIPTION OF THE INVENTION

The ethylenically unsaturated hydrocarbon employed as a precursor of the terpolymers of the invention have a single carbon-carbon double bond, up to 10 carbon atoms inclusive and are aliphatic such as ethylene and other α-olefins including propylene, 1-butene, isobutyl, 1-hexene and 1-decene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. In the terpolymers of the invention it is suitable to employ a single ethylenically unsaturated hydrocarbon or a mixture of two or more ethylenically unsaturated hydrocarbons. In general, however, it is preferred to employ a single compound as the ethylenically unsaturated hydrocarbon component of the terpolymers of the invention. Ethylene and styrene are preferred as the ethylenically unsaturated hydrocarbon and particularly preferred is ethylene.

The non-conjugated alkadiene component of the terpolymers of the invention is hydrocarbyl and contains up to 10 carbon atoms inclusive and two carbon-carbon double bonds which are separated by at least one carbon atom. The non-conjugated alkadiene is acyclic such as 1,5-hexadiene, 1,5-heptadiene, 1,7-octadiene, 1,8-decadiene and 1,9-decadiene or is alicyclic such as 1,4-cyclooctadiene. Acyclic dienes are preferred, particularly those non-conjugated alkadienes of the formula

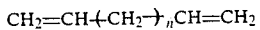 (I)

wherein n is an integer from 1 to 6 inclusive, preferably from 2 to 4 inclusive. The compounds 1,5-hexadiene and 1,7-octadiene are preferred non-conjugated alkadiene monomers for incorporation into the terpolymers of the invention. Although a mixture of the non-conjugated alkadienes may be used in the terpolymers of the invention, it is generally preferred to utilize a single non-conjugated alkadiene.

The terpolymers are prepared by contacting the unsaturated hydrocarbons and the carbon monoxide in the presence of a catalyst composition formed from a compound of palladium, the anion of a non-hydrohalogenic acid having a pKa (measured in aqueous solution at 18° C.) below 4 and preferably below 2, and a bidentate ligand containing phosphorous or nitrogen. Although a variety of palladium compounds are useful as catalyst composition precursors, the preferred palladium compounds are palladium carboxylates and palladium acetate, palladium propionate and palladium octanoate are suitable. Particularly preferred as the catalyst composition precursor is palladium acetate. The anion component of the catalyst composition mixture is preferably the anion of a non-hydrohalogenic acid having a pKa below 2. Suitable anions are anions of inorganic acids such as sulfuric acid and perchloic acid or anions of organic acids including carboxylic acids such as trichloroacetic acid, trifluoroacetic acid and difluoroacetic acid, as well as sulfonic acids such as p-toluenesulfonic acid, methanesulfonic acid and trifluoromethanesulfonic acid. The preferred anions are anions of trifluoroacetic acid or p-toluenesulfonic acid. The anion is preferably provided in the form of the free acid but in an alternative embodiment of the process the anion is provided in the form of a salt, particularly a non-noble transition metal salt such as a copper salt. In yet another embodiment the anion component and the palladium component are added as a single compound, e.g., palladium p-toluenesulfonate or acetonitrile complexes thereof.

The bidentate ligand employed in the formation of the catalysts of the invention contains at least one atom of phosphorus or nitrogen. In the production of polymers of carbon monoxide and at least one ethylenically unsaturated hydrocarbon, It is known to employ bidentate ligands which are phosphorus-phosphorus, nitrogen-nitrogen, phosphorus-arsenic, phosphorus-sulfur or phosphorus-nitrogen and such bidentate ligands are also usefully employed in the process of the invention. The preferred bidentate ligands to be employed as catalyst composition precursors in the process of the invention are bidentate ligands of phosphorus or nitrogen, i.e., bidentate ligands containing two atoms of phosphorus or two atoms of nitrogen.

The preferred bidentate ligands of phosphorus are of the formula

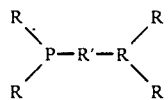  (II)

wherein R independently is aromatic of up to 10 carbon atoms and is hydrocarbyl or is substituted hydrocarbyl having at least one alkoxy substituent, preferably methoxy, in a ring position ortho to the carbon connecting the R' group to the phosphorus. Illustrative R groups are phenyl, naphthyl, 2-methoxyphenyl, 2,6-diethoxyphenyl and 2,4-dimethoxyphenyl. The R' group is an organic bridging group of up to 10 carbon atoms inclusive having from 2 to 4 carbon atoms inclusive in the phosphorusphosphorus bridge. The preferred R' groups are alkylene groups such as 1,2-ethylene, 1,3-propylene or 1,4-butylene. Particularly preferred as the R' group is the 1,3-propylene or trimethylene group. The ligands 1,3-bis(diphenylphosphino)propane and 1,3-bis[di(2-methoxyphenyl)phosphino]propane are particularly preferred as bidentate ligands of phosphorus.

The preferred bidentate ligands of nitrogen are of the formula

  (III)

wherein X independently is a bridging group of from 3 to 4 atoms in the bridge, at least two of which are carbon atoms. Illustrative of such preferred nitrogen bidentate ligands are 2,2'-bipyridine, 4,4'-dimethyl2,2'-bipyridine and 1,10-phenanthroline bidentate ligand of nitrogen is 2,2'-bipyridine.

The polymerization process of the invention is conducted by contacting the monomers in the presence of the catalyst composition in a reaction diluent under polymerization conditions. Reaction diluents are preferably diluents in which the polymer product is substantially insoluble, e.g., lower alkanols such as methanol or ethanol, lower alkanols such as acetone or methyl ethyl ketone, or mixtures thereof. Methanol is particularly preferred as the reaction diluent. Typical polymerization conditions include a reaction temperature of from about 20° C. to about 150° C., preferably from about 30° C. to about 130° C. Suitable reaction pressures are from about 2 bar to about 150 bar but pressures from about 2 bar to about 150 bar are preferred.

To effect polymerization, sufficient catalyst is employed to provide from about $1 \times 10^{-7}$ mol to about $1 \times 10^{-3}$ mol of palladium per mo) of total hydrocarbon to be polymerized. Amounts of catalyst sufficient to provide from about $1 \times 10^{-6}$ mol to about $1 \times 10^{-3}$ mol of palladium per mol of total hydrocarbon to be polymerized are preferred. Within the mixture from which the catalyst composition is formed, each of the anion component and the bidentate ligand should be present in a quantity of from about 1 mol to about 1000 mols per mol of palladium with quantities of iron about 2 mols to about 100 mols per mol of palladium being preferred. It is useful on occasion but not required to employ an organic oxidizing agent as a fourth component of the catalyst composition mixture and aliphatic nitrite compounds such as butyl nitrite, aromatic nitro compounds such as nitrobenzene and 2,4-dinitrobenzene and 1,2- and 1,4-quinones are useful for this purpose. The 1,4-quinones are preferred as the organic oxidant when such is used and 1,4-benzoquinone, 1,4-naphthoquinone and 1,4-anthraquinone are satisfactory. Particularly preferred is 1,4-benzoquinoe. The presence of an organic oxidant in the catalyst composition mixture is not required, but if present the oxidant is employed in a quantity of up to 10,000 mols per mol of palladium. When the organic oxidizing agent is utilized, amounts of oxidizing agent from about 10 mols to about 5000 mols per mol of palladium are preferred.

The total quantity of unsaturated hydrocarbon to be provided to the polymerization mixture is such that the molar ratio of total hydrocarbon to carbon monoxide is from about 10:1 to about 1:10 but preferably the ratio is from about 5:1 to about 1:5. The molar ratio of ethylenically unsaturated hydrocarbon to non-conjugated alkadiene is not critical and molar ratios of from about 10:1 to about 1:10 are satisfactory with molar ratios from about 4:1 to about 1:4 being preferred.

During polymerization the contact of the monomeric reactants and the catalyst composition is maintained by conventional methods such as shaking or stirring. Subsequent to reaction the terpolymer product which is normally insoluble in the reaction diluent is recovered by well known procedures such as filtration or decantation. The polymer product is used as such or is purified if desired as by contacting with a solvent or complexing agent which is selective for catalyst residues.

The terpolymer product is a linear alternating polymer wherein a moiety of carbon monoxide alternates with either a moiety of the ethylenically unsaturated hydrocarbon or a moiety of the non-conjugated alkadiene, and the terpolymer will contain substantially one molecule of carbon monoxide for each molecule of hydrocarbon. The terpolymers are represented by the formula

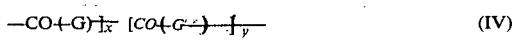 (IV)

wherein G is the moiety of the ethylenically unsaturated hydrocarbon polymerized through the ethylenic unsaturation and G is the moiety of the non-conjugated alkadiene polymerized through one of the carbon-carbon double bonds. The terpolymers of the invention contain both units found randomly in the polymer chain and are characterized by a relatively high proportion of the moiety of the non-conjugated alkadiene, as compared with related terpolymers produced from conjugated alkadiene, and the ratio of x:y is on average no more than about 150 and often no more than about 100. The resulting relatively high proportion of pendant groups containing carbon-carbon unsaturation provides for greater functionalization of the polymer molecule, as through the carboxylation of the pendant groups or addition of halo or mercapto moieties to the carbon-carbon double bond.

The terpolymers without functionalization are thermoplastic and are processed by methods conventional for thermoplastics, e.g., extrusion, injection molding and thermoforming, into sheets, films, fibers and shaped articles such as containers for food and drink.

The invention is further illustrated by the following Comparative Examples (not of the invention) and the following Illustrative Embodiments which should not be construed as limiting the invention.

ILLUSTRATIVE EMBODIMENT I

A terpolymer of carbon monoxide, ethylene and 1,5-hexadiene was prepared by charging to an autoclave of 250 ml capacity a catalyst composition solution comprising 50 ml of methanol, 0.1 mmol of palladium acetate, 2 mmol of trifluoroacetic acid and 0.15 mmol of 1,3-bis[di(2methoxyphenyl)phosphino]propane. The air present in the autoclave was removed by evacuation and 10 ml of 1,5-hexadiene was introduced followed by carbon monoxide introduction until a pressure of 30 bar was reached and ethylene until a pressure of 45 bar was reached. The contents of the autoclave were heated to 80° C. and maintained at that temperature for 5 hours. The polymerization was then terminated by cooling the autoclave and contents to room temperature and releasing the pressure. The polymer product was recovered by filtration, washed with methanol and dried in vacuo at room temperature. The yield of terpolymer was 7.7 g.

ILLUSTRATIVE EMBODIMENT II

A terpolymer of carbon monoxide, ethylene and 1,5-hexadiene was prepared by a procedure substantially similar to that of Illustrative Embodiment I except that 0.5 mmol of p-toluenesulfonic acid was used instead of the trifluoroacetic acid, 3 mmol of 2,2'-bipyridine was used instead of the diphosphinopropane, 20 mmol of 1,4-benzoquinone was additionally present in the catalyst composition solution and the reaction temperature was 70° C. instead of 80° C. The yield of terpolymer was 8.8 g.

ILLUSTRATIVE EMBODIMENT III

A terpolymer of carbon monoxide, styrene and 1,7-octadiene was produced by a procedure substantially similar to that of Illustrative Embodiment I except that (a) the catalyst composition solution comprised 15 ml of methanol, 0.1 mmol of palladium acetate, 1 mmol of p-toluenesulfonic acid, 3 mmol of 2,2'-bipyridine and 20 mmol of 1,4-benzoquinone, (b) 35 ml of styrene and 10 ml of 1,7-octadiene were employed in place of the ethylene and the 1,5-hexadiene, (c) carbon monoxide was added until a pressure of 40 bar was reached instead of 30 bar, and (d) the reaction temperature was 70° C. instead of 80° C. A yield of 11.5 g of terpolymer was obtained.

COMPARATIVE EXAMPLE I

A terpolymer of carbon monoxide, ethylene and 1,3-butadiene was prepared by a procedure substantially like that of Illustrative Embodiment I except that 5 ml of butadiene was employed instead of the 1,5-hexadiene. The yield of terpolymer was 0.1 g.

COMPARATIVE EXAMPLE II

A terpolymer of carbon monoxide, ethylene and 1,3-butadiene was produced by a procedure substantially similar to that of Illustrative Embodiment II except that 5 ml of butadiene was used instead of the 1,5-hexadiene. The yield of terpolymer was 0.1 g.

Analysis

Each of the above polymer products was examined by $^{13}$C-NMR analysis. Each polymer had a random distribution of units. In Illustrative Embodiments I and II the units were $-CO+C_2H_4+$ and $-CO+C_6H_{10}+$ with an average of 2 and 7 units respectively of $-CO+C_6H_{10}+$ per 100 units of $-CO+C_2H_4+$. The units of Illustrative Embodiment III were $-CO+C_8H_8+$ and $-CO+C_8H_{14}+$ with an average of 10 units of $-CO+C_8H_{14}+$ per 100 units of $-CO+C_8H_8+$. The terpolymers of Comparative Examples I and II were made up of were $-CO+C_2H_4+$ units and $-CO+C_4H_6+$ units with an average of less than 2 units of $-CO+C_4H_6+$ per 1000 units of $-CO+C_2H_4+$.

What is claimed is:

1. A linear alternating terpolymer of carbon monoxide, monoethylenically unsaturated hydrocarbon and non-conjugated alkadiene having at least one carbon atom between the two carbon-carbon double bonds.

2. The terpolymer of claim 1 having repeating units

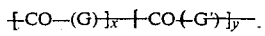

wherein G is the moiety of the monoethylenically unsaturated hydrocarbon of up to 10 carbon atoms inclusive polymerized through the ethylene linkage, G' is the moiety of the non-conjugated alkadiene of up to 10 carbon atoms inclusive polymerized through one of the carbon-carbon double bonds and the ratio of x:y is no more than about 150.

3. The terpolymer of claim 2 wherein G is a moiety of ethylene or styrene.

4. The terpolymer of claim 3 wherein G' is a moiety of the alkadiene of the formula $$CH_2=CH-Ch_{2n}CH=CH_2$$

wherein n is an integer from 1 to 6 inclusive.

5. The terpolymer of claim 4 wherein the ratio of x:y is no more than about 100.

6. The terpolymer of claim 4 wherein G is a moiety of ethylene.

7. The terpolymer of claim 6 wherein G' is a moiety of 1,5-hexadiene.

8. The terpolymer of claim 4 wherein G is a moiety of styrene.

9. The terpolymer of claim 8 wherein G' is a moiety of 1,7-octadiene.

10. A process for the production of a linear alternating terpolymer of carbon monoxide, monoethylenically unsaturated hydrocarbon and non-conjugated alkadiene having at least one carbon atom between the two carbon-carbon double bonds by contacting the carbon monoxide, monoethylenically unsaturated hydrocarbon and non-conjugated alkadiene under polymerization conditions in the presence of a catalyst composition formed from a palladium compound, the anion of a non-hydrohalogenic acid having a pKa below 2 and a bidentate ligand containing phosphorus or nitrogen.

11. The process of claim 10 wherein the alkadiene is of the formula $$CH_2=CH-(CH_2)_n-CH=CH_2$$

wherein n is an integer from 1 to 6 inclusive.

12. The process of claim 11 wherein the monoethylenically unsaturated hydrocarbon is ethylene or styrene.

13. The process of claim 12 wherein the palladium compound is palladium acetate.

14. The process of claim 13 wherein the anion is the anion of trifluoroacetic acid or p-toluenesulfonic acid.

15. The process of claim 14 wherein the ligand containing phosphorus or nitrogen is a bidentate ligand of phosphorus or nitrogen.

16. The process of claim 15 wherein the ligand is a ligand of phosphorus of the formula

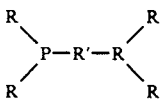

wherein R independently is aromatic of up to 10 carbon atoms inclusive and R' is an organic linking group of up to 10 carbon atoms inclusive having 2 to 4 carbon atoms inclusive in the phosphorus-phosphorus bridge.

17. The process of claim 16 wherein the ligand is 1,3-bis(diphenylphosphino)propane.

18. The process of claim 16 wherein the ligand is 1,3-bis[di(2-methoxyphenyl)phosphino]propane.

19. The process of claim 15 wherein the ligand is a ligand of nitrogen of the formula

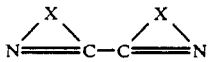

wherein X independently is a bridging group of from 3 to 4 atoms in the bridge, at least two of which are carbon atoms.

20. The process of claim 19 wherein the ligand is 2,2'-bipyridine.

* * * * *